(No Model.)
W. B. LINDSAY, W. E. TONNER, A. LOWMILLER.
FILTER AND CLEANER.
No. 555,104.  Patented Feb. 25, 1896.
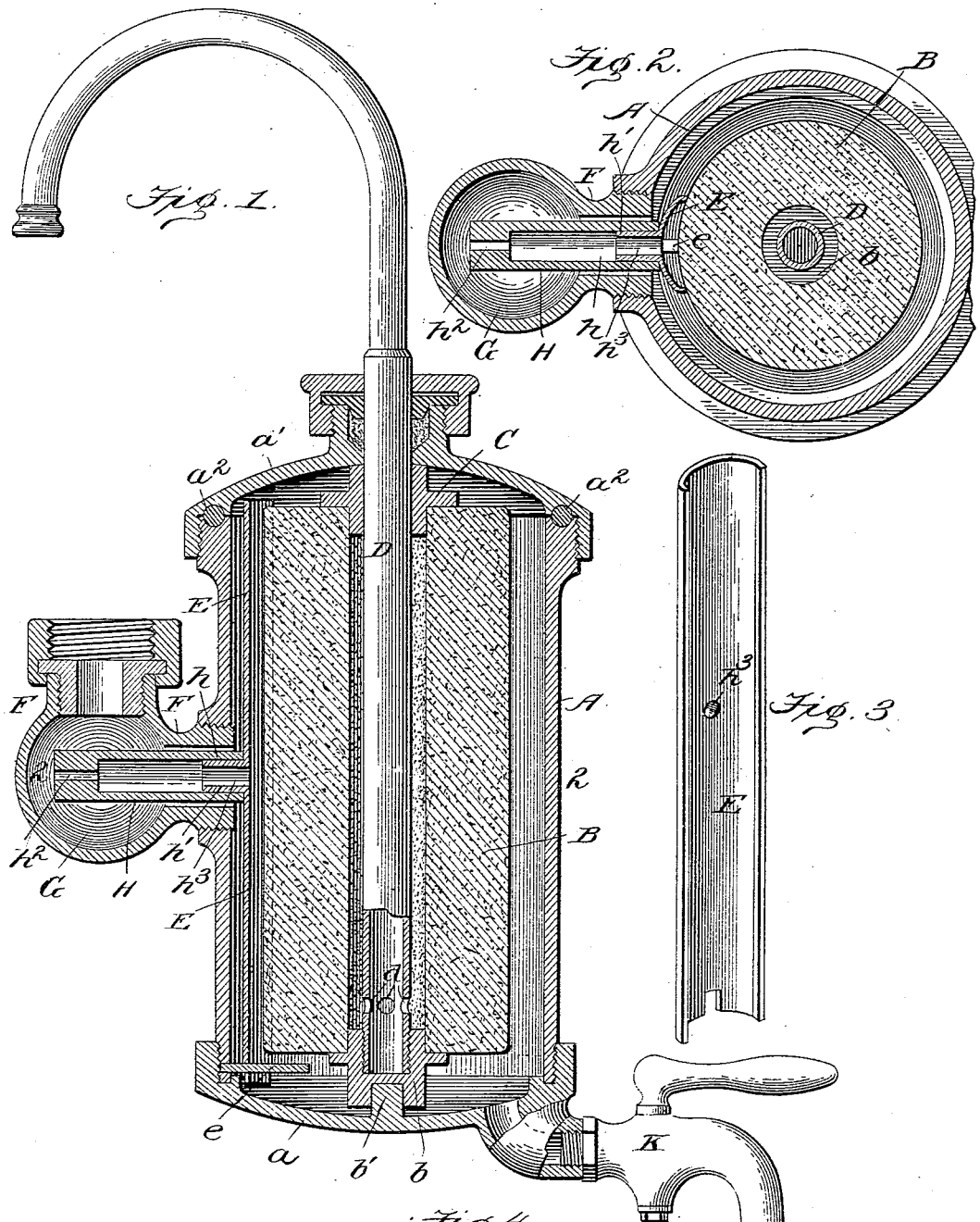

UNITED STATES PATENT OFFICE.

WILLIAM B. LINDSAY, WILLIAM E. TONNER, AND ALPHEUS LOWMILLER, OF STEUBENVILLE, OHIO.

FILTER AND CLEANER.

SPECIFICATION forming part of Letters Patent No. 555,104, dated February 25, 1896.

Application filed June 10, 1895. Serial No. 552,337. (No model.)

*To all whom it may concern:*

Be it known that we, WILLIAM B. LINDSAY, WILLIAM E. TONNER, and ALPHEUS LOW-MILLER, of Steubenville, in the county of Jefferson, State of Ohio, have invented an Improved Filter and Cleaner, of which the following is a specification.

This invention relates generally to that class of filters known as "porous wall," in which the water is passed through the walls of a porous cylinder or receptacle for the purpose of clarifying said water; and this invention relates particularly to the means for cleaning the exterior of said porous receptacle. Heretofore filters of this class have been constructed with revolving cleaners or scrapers, which were moved about the exterior of the filtering-receptacle, to clean the outer surface, and filters have also been constructed in which the cleaner was made stationary and the receptacle revolved to contact therewith, and in both cases various adjusting devices have been devised for increasing or decreasing the pressure of the cleaner upon the filtering receptacle or cylinder. These means of adjustment, however, have proved inconvenient and impracticable, as they are not usually understood or operated by any one except a skilled mechanic, and the filter is therefore liable to damage when handled by one not thoroughly conversant with this class of filters.

The object of our invention is to remedy all these defects, and provide a cleaner in which the pressure can be regulated by the force of the water passing through the filter; and a still further object is to provide a free circulation of water during such cleaning operation.

With this and such other objects as will appear hereinafter our invention consists in a peculiar construction of the various parts, and the novel combination and arrangement of the various parts, as will be hereinafter more fully described, and pointed out in the claims.

In the drawings, forming a part of this specification, Figure 1 is a central vertical sectional view of our improved filter. Fig. 2 is a horizontal section on the line 2 2 of Fig. 1. Figs. 3 and 4 show details of construction.

In carrying out our invention we employ an outer case, A, having a bottom $a$ and a detachable cover $a'$, and between the top of case and cover we arrange a suitable packing-ring $a^2$. Within the outer case is arranged the porous filtering cylinder or receptacle B, which is preferably made of some porous material, closed at its lower end by a socket plug or bearing $b$, which fits upon a central stud $b'$ formed upon the center of the bottom of the outer case, thus supporting the filtering-cylinder at the center of the main case. Fitting in the upper end of the cylinder B is a collar C, through which extends a pipe D, said pipe extending downward nearly through the cylinder, and being threaded into the interiorly-threaded portion of the plug or bearing $b$, arranged at the bottom of the cylinder. The upper end of the pipe D projects through the cover of the main case, and, if desired, may be surrounded by any suitable form of stuffing-box, gasket or packing-rings.

The lower end of the pipe D is perforated, as shown at $d$, to permit the filtered water to enter said pipe, and the upper end of the pipe is curved or bent over, as shown, in order to discharge the water therefrom in a downward direction.

The pipe D being rigidly connected with the cylinder B through the medium of the plug or nut $b$, said cylinder can be revolved whenever desired by simply turning the pipe D, and the cylinder revolves upon a central stud $b'$.

A metallic cleaner or rubber is arranged within the main case at one side of the cylinder B and bears against said cylinder at that point. This cleaner or scraper A consists of a metallic plate E, curved longitudinally or between its edges, so that said edges bear against the outer surface of the cylinder, while the remaining portions of the cleaner or scraper are held away from said cylinder, thus providing a longitudinal space between said cleaner and cylinder throughout their entire lengths, which permits a free circulation of water during the cleaning operation, as will be more fully explained hereinafter.

The cleaner or scraper is slotted or bifurcated at its lower end to straddle a guide-pin $e$, which is rigidly attached to one side of the case near the bottom of the same and rests below the cylinder B. This guide-pin supports the cleaner E, and said cleaner or receptacle-plate can be moved back and forth without being disengaged from its proper position.

The water-supply pipe F is connected with the outer casing at a point about midway its length and directly opposite the cleaner E, said pipe being preferably constructed with a chamber G where it connects with the main casing, and arranged within said chamber is a piston H, which nearly fills the pipe F where it meets the casing A.

The piston H is formed with a socket $h$ at its inner end, which receives a tubular lug $h'$, formed upon the cleaner or scraper plate E, and at its outer end said piston has a small bore $h^2$, which leads into the socket $h$, said bore being slightly smaller than the bore $h^3$ of the tubular lug $h'$. The plate E is of course perforated at the point of connection of the lug. By this arrangement the water in passing through the pipe F into the casing A will exert a certain amount of pressure upon the outer end of the piston H, and thereby force the cleaner against the filtering cylinder or chamber G, and by increasing or decreasing the pressure of the water the pressure of the cleaner upon the cylinder can be increased or decreased, as desired. At the same time a jet of water will pass through the bores of the piston and lug and the space between the cleaner and cylinder, and, issuing, as it will, with considerable force, all the sediment scraped off the cylinder will be quickly washed away, and by so constructing the cleaner, lug and piston the operation of cleaning is greatly facilitated and expedited.

The draw-off faucet K is connected with the bottom of the main casing A, through which water can be drawn at any time, and in cleaning the filter this faucet will of course be opened.

Now in operation the water passes through the supply-pipe into the main casing A, from which it passes through the porous wall of the cylinder into said cylinder and out through the pipe D. The normal pressure of the water will tend to hold the metallic cleaner against the porous cylinder, and whenever it is desired to clean the outer surface of said cylinder from the sediment which has collected thereon it is only necessary to revolve said cylinder by turning the discharge-pipe upon its axis. The draw-off faucet is, of course, open at this time, and the sediment can be drawn from the main case A, the filtering operation can then be resumed, and whenever it is desired to clean the cylinder upon its exterior it is only necessary to revolve the same, so that the cleaner or rubber will scrape this exterior, and by increasing the pressure of the amount of the water-flow any desired pressure can be had upon the cleaner or rubber.

Having thus described our invention, what we claim as new, and desire to secure by Letters Patent, is—

1. In a filter of the class described, the combination, with the outer case, of the inner or filtering cylinder, the discharge-pipe connected therewith as described, the metallic cleaner or rubber, having a lug about midway its length, and slotted at its lower end, the guide-pin, upon which said cleaner rests, the water-supply pipe, tapped into the side of the main case, the piston located therein, and having a socket at its inner end adapted to receive the lug upon the cleaner, substantially as shown and described.

2. In a filter of the class described, the combination, with the outer case, of the inner or filtering cylinder arranged therein, a supply-pipe leading into said outer case, a metallic cleaner-plate, arranged between the outer case and the inner cylinder and bearing against said cylinder at the edges of the plate, a tubular lug connected with said plate, and a piston located in the discharge-pipe and having a socket to receive said tubular lug and a bore leading into said socket, substantially as shown and described.

3. The combination, with the outer case, a cylinder, of the cleaner-plate curved transversely between its edges, which edges are adapted to contact with the outer surface of the cylinder, the tubular lug connected to said plate, the outer pipe leading into the outer casing, a piston located in said pipe, and having a socket to receive the tubular lug and a bore leading into said socket whereby a passage is established between the supply-pipe and the space between the cleaner and cylinder, substantially as shown and described.

In testimony whereof we affix our signatures in the presence of two witnesses.

WILLIAM B. LINDSAY.
WILLIAM E. TONNER.
ALPHEUS LOWMILLER.

Witnesses:
THOS. B. LINDSAY,
H. H. FICKES.